(12) United States Patent
Nishida et al.

(10) Patent No.: US 6,480,771 B2
(45) Date of Patent: Nov. 12, 2002

(54) APPARATUS FOR DETERMINING A FAILURE OF WHEEL SPEED SENSORS

(75) Inventors: Kenzo Nishida, Saitama-ken (JP); Norihisa Nihanda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/783,599

(22) Filed: Feb. 15, 2001

(65) Prior Publication Data

US 2001/0027362 A1 Oct. 4, 2001

(30) Foreign Application Priority Data

Mar. 28, 2000 (JP) ......................................... 2000-087904

(51) Int. Cl.$^7$ .............................. G06F 7/00; G06F 19/00
(52) U.S. Cl. .............................. 701/34; 701/29; 701/64; 701/85; 701/87; 701/101; 701/82; 701/93; 701/89; 701/1; 701/70; 701/76; 180/197; 180/235; 180/23; 180/274; 340/310.01; 340/650; 340/438; 74/336 R; 318/432; 318/430
(58) Field of Search ............................. 701/34, 64, 29, 701/87, 35, 101, 93, 82, 83.1, 70, 76, 95, 89; 180/197, 235, 233, 247, 63.4, 282, 249; 74/336 R; 324/546; 340/310.01, 438, 439, 630; 318/432, 430; 303/122.02, 112, 147; 123/349, 350, 396, 399

(56) References Cited

U.S. PATENT DOCUMENTS

| | | | | | |
|---|---|---|---|---|---|
| 5,117,711 A | * | 6/1992 | Iizuka | .......................... | 192/3.3 |
| 5,197,008 A | * | 3/1993 | Itoh et al. | .................... | 180/197 |
| 5,272,632 A | * | 12/1993 | Noguchi et al. | ............ | 477/109 |
| 5,625,558 A | * | 4/1997 | Togai et al. | ................. | 123/349 |
| 5,629,852 A | * | 5/1997 | Yokoyama et al. | ......... | 701/101 |
| 5,754,970 A | * | 5/1998 | Takasaki et al. | ............ | 180/233 |
| 5,809,437 A | * | 9/1998 | Breed | ........................... | 701/29 |
| RE36,152 E | * | 3/1999 | Hosseini et al. | ............ | 180/197 |

* cited by examiner

Primary Examiner—William A. Cuchlinski, Jr.
Assistant Examiner—Ronnie Mancho
(74) Attorney, Agent, or Firm—Armstrong, Westerman & Hattori, LLP

(57) ABSTRACT

An apparatus for determining a failure of wheel speed sensors, which is capable of properly determining whether or not a wheel speed detection system including the wheel speed sensors has failed, if at least a wheel speed detected by the wheel speed sensors indicates a stopped state of a corresponding wheel. An engine rotational speed is detected, and an input-output rotational speed ratio of a torque converter of an automatic transmission mounted in the vehicle is calculated. A shift range of the automatic transmission is detected. Whether or not the vehicle is traveling is determined based on the engine rotational speed and the input-output rotational speed ratio when the automatic transmission is in a traveling range. It is determined that the wheel speed detection system including the wheel speed sensors has failed, if it is determined that the vehicle is traveling, and at the same time, at least one of wheel speed sensors indicates a stopped state of a corresponding one of the wheels.

6 Claims, 4 Drawing Sheets

APPARATUS FOR DETERMINING A FAILURE OF WHEEL SPEED SENSORS

BACKGROUND OF THE INVENTION

1. Field of the Invention

This invention relates to an apparatus for determining a failure of wheel speed sensors that detect wheel speeds of respective wheels of a vehicle for control of torques transmitted to at least two of the wheels.

2. Description of the Prior Art

Conventionally, it is well-known to control torques transmitted to wheels in dependence on the wheel speeds of respective wheels detected by wheel speed sensors of the vehicle. For instance, Japanese Laid-Open Patent Publication (Kokai) No. 6-72171 discloses a technique concerning a torque distribution system for a four-wheel drive vehicle. According to this technique, the engagement force of a clutch which changes the torque distribution between front and rear wheels is controlled depending on the wheel speeds of the four front and rear wheels detected by the wheel speed sensors. More specifically, wheel speed signals indicative of the respective wheel speeds sensed by the wheel speed sensors are input to a 4WD-ECU, together with a steering angle signal from a steering angle signal sensor and a yaw rate signal from a yaw rate sensor. The 4WD-ECU controls the engagement force of the clutch in response to these parameter signals.

Further, if abnormality of the wheel speed sensors is detected, an alarm is issued by the control operation of the 4WD-ECU for notifying the user of the abnormality of the wheel speed sensors, and the engagement force of the clutch is set to such a value as will make stable the behavior of the vehicle, whereby traveling stability of the vehicle is ensured even if abnormality of the wheel speed sensors has occurred.

In this conventional torque distribution system, however, the wheel speed sensors and the 4WD-ECU are generally connected by using a harness. This sometimes causes all the wheel speed signal values delivered from the wheel speed sensors to assume the same value "0" upon occurrence of disconnection of a coupler of the harness or the breaking of a wire. Further, such a state in which the wheel speed signal values all assume the value "0" of course occurs when the vehicle is actually standing as well. In the conventional torque distribution system, however, the method of distinguishing between causes of this state has not yet been established, that is, a method has not yet been established for determining whether the above state is caused by an actually stopped state of the vehicle or by a failure of the wheel speed sensors due to disconnection of the coupler of the harness or the like. This can result in an erroneous determination of normality/abnormality of the wheel speed sensors.

SUMMARY OF THE INVENTION

It is an object of the invention to provide an apparatus for determining a failure of wheel speed sensors that detect wheel speeds of respective wheels of a vehicle, which is capable of properly determining whether or not a wheel speed detection system including the wheel speed sensors has failed when any of wheel speeds detected by the wheel speed sensors indicates a stopped state of a corresponding wheel.

To attain the above object, the invention provides a apparatus for determining a failure of a wheel speed detection system of an automotive vehicle including an internal combustion engine, an automatic transmission having a torque converter, and a plurality of wheels, the wheel speed detection system including a plurality of wheel speed sensors for detecting respective wheel speeds of the plurality of wheels, for control of torques transmitted to at least two of the plurality of wheels via the automatic transmission.

The apparatus according to the invention comprising:

engine rotational speed detection means for detecting a rotational speed of the engine;

input-output rotational speed ratio calculation means for calculating an input-output rotational speed ratio of the torque converter based on an input rotational speed and an output rotational speed of the torque converter;

shift range detection means for detecting a shift range of the automatic transmission;

traveling state determination means for determining whether or not the vehicle is traveling, based on the detected engine rotational speed and the calculated input-output rotational speed ratio when the shift range detected by the shift range detection means is a traveling range; and sensor failure determination means for determining that the wheel speed detection system has failed if it is determined by the traveling state determination means that the vehicle is traveling, and at the same time, at least one of the plurality of wheel speed sensors indicates a stopped state of a corresponding one of the wheels.

According to this apparatus, the traveling determination means determines whether or not the vehicle is traveling based on the engine rotational speed and the input-output rotational speed ratio of the torque converter when the automatic transmission is in a traveling range. When the vehicle is traveling, the engine rotational speed is in a range of values equal to or greater than a lower limit value to prevent an engine stall. Further, when the automatic transmission is in a traveling range, the rotational speed of an output shaft of the torque converter is in a range of values equal to or greater than a predetermined value since the output shaft is rigidly connected to drive wheels. Therefore, the input-output rotational speed ratio of the torque converter, which is a ratio between the rotational speed of the output shaft and that of an input shaft of the torque converter, i.e., the engine rotational speed, is also in a range of values equal to or larger than a predetermined value. Therefore, by determining whether the vehicle is traveling as described above, it is possible to appropriately determine whether or not the vehicle is actually traveling.

Further, in the apparatus of the invention, when it is determined by the traveling determination means that the vehicle is running, the sensor failure determination means determines that the wheel speed detection system including the wheel speed sensors has failed, on condition that at least one of the wheel speeds detected by the wheel speed sensors indicates a stopped state of a corresponding wheel. This condition or assumed state is an abnormal one in which at least one of the wheel speeds indicates a stopped state of a wheel when the vehicle is actually running. Therefore, by the above failure determination, it is possible to appropriately detect occurrence of a failure of a wheel speed sensor itself, and that of a failure of the wheel speed detection system including the wheel speed sensors, due to disconnection of a coupler of a harness, breaking of a wire, or the like. Further, when the vehicle is actually standing or stopped, this state of the vehicle is properly determined by the traveling determination means, thereby inhibiting the sensor failure determination means from carrying out the failure determination. This makes it is possible to reliably avoid erroneous determination of a failure of the wheel speed sensors, when they are normally operating.

Preferably, the apparatus further includes failure determination inhibition means for inhibiting failure determination by the sensor failure determination means for a predetermined time period after the shift range detection means detects that the shift range of the automatic transmission is switched to the traveling range from a neutral state of the automatic transmission.

Immediately after the automatic transmission has entered the traveling range from the neutral state, stirring of oil in the torque converter increases an amount of change in the input-output rotational speed ratio of the torque converter, thereby making the input-output rotational speed ratio unstable. This can prevent appropriate execution of traveling determination which is carried out based on the unstable input-output rotational speed ratio. Accordingly, as described above, if failure determination by the sensor failure determination means is inhibited for a predetermined time period after the automatic transmission has entered the traveling range from the neutral state, it is possible to eliminate adverse influence of the unstable input-output rotational speed ratio on the failure determination, which makes it possible to reliably prevent erroneous failure determination caused by an erroneous determination of the traveling state of the vehicle.

Preferably, the traveling state determination means includes a table defining a region in which the vehicle is determined to be necessarily traveling, based on a relationship between the engine rotational speed and the input-output rotational speed ratio.

Preferably, when all of the plurality of wheel speed sensors indicate respective stopped states of the plurality of wheels associated therewith, the sensor failure determination means determines that the wheel speed detection system has failed.

Alternatively, or in combination, when any of the plurality of wheel speed sensors indicates a stopped state of a corresponding one of the plurality of wheels, the sensor failure determination means determines that the any of the plurality of wheel speed sensors has failed.

The above and other objects, features, and advantages of the invention will become more apparent from the following detailed description taken in conjunction with the accompanying drawings.

BRIEF DESCRIPTION OF THE PREFERRED EMBODIMENTS

The invention will now be described in detail with reference to the drawings showing an embodiment thereof.

Figure 1:
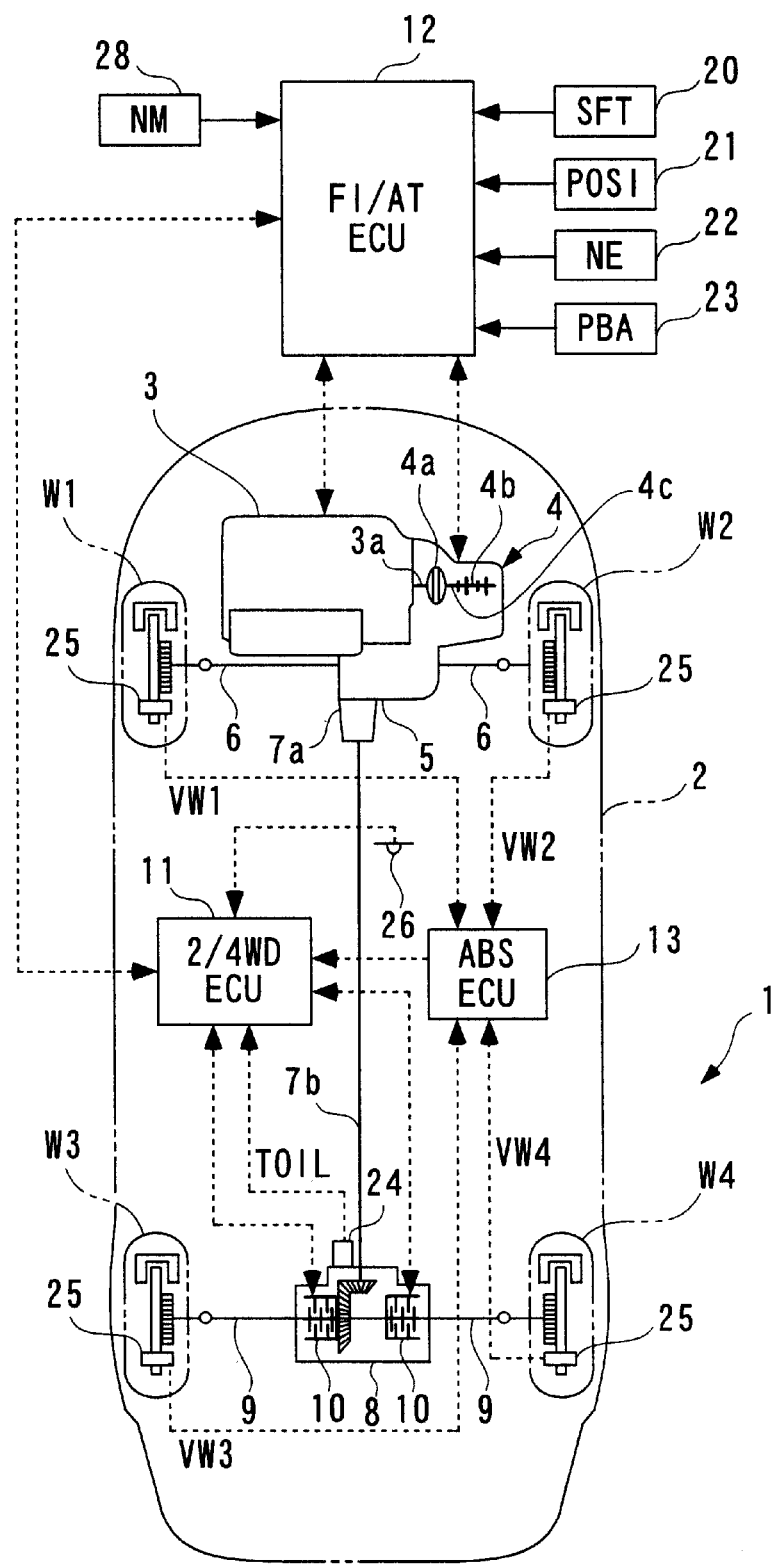
FIG. 1 is a block diagram schematically showing the arrangement of a four-wheel-drive vehicle to which is applied an apparatus for determining a failure of wheel speed sensors, according to an embodiment of the invention.

Referring first to FIG. 1, there is schematically shown the arrangement of a four-wheel-drive vehicle 2 to which is applied an apparatus for determining a failure of wheel speed sensors, according to the invention. As shown in the figure, this four-wheel-drive vehicle (hereinafter referred to as "the vehicle") 2 includes an engine 3 transversely mounted in a front part thereof and an automatic transmission 4 associated with the engine 3.

The automatic transmission 4 includes a torque converter 4a for transmitting an output power or torque of the engine 3 to the automatic transmission 4, a shift lever, not shown, which is capable of selecting any one of eight shift positions consisting of "1, 2, 3, D4, D5, N, R, P", and a gear mechanism 4b, partly shown, which can be shifted to any of six gear positions having respective change gear ratios, i.e., first to fifth speed gear positions and a reverse gear position. The torque converter 4a has an input side thereof directly connected to an output shaft 3a of the engine 3, and an output side thereof directly connected to a main shaft 4c of the gear mechanism 4b. Further, when the shift position is set to "1" to "D5" and "R", the gear position of the automatic transmission 4 is switched to the first speed gear position, a range of the first and second speed gear positions, a range of the first to third speed gear positions, a range of the first to fourth speed gear positions, a range of the first to fifth speed gear positions, and the reverse gear position, respectively.

The automatic transmission 4 has a gear position sensor 20 and a shift position sensor 21 mounted therein. The gear position sensor 20 detects a gear position, and delivers a signal SFT indicative of the detected gear position to an FI/AT•ECU 12, referred to hereinafter. It should be noted that the gear position signal SFT assumes values of "1" to "5", and "6", for the first to fifth speed gear positions and the reverse gear position, respectively.

The shift position sensor 21 detects a shift position of the automatic transmission 4, and delivers a signal POSI indicative of the detected shift position to the FI/AT•ECU 12. It should be noted that the shift position signal POSI assumes a value of "1" for the shift position of "N" or "P", a value of "2" for the shift position of "R", and values of 3 to 7 for the respective shift positions of "1" to "D5". Further, when the automatic transmission 4 is in a "NO" position (state in which the shift position of the automatic transmission 4 cannot be identified since the shift lever is located between shift positions), "0" is allocated to the value of the shift position signal POSI.

The above FI/AT•ECU 12 is formed or implemented by a microcomputer including a RAM, a ROM, a CPU, and an I/O interface, none of which are shown, and controls the operation of the engine 3 and that of the automatic transmission 4. Connected to this FI/AT•ECU 12 are an engine rotational speed sensor 22 and an intake pipe absolute pressure sensor 23. The respective sensors 22, 23 sense an engine rotational speed NE and an intake pipe absolute pressure PBA, and deliver signals indicative of the sensed engine rotational speed NE and intake pipe absolute pressure PBA to the FI/AT•ECU 12. Further, a main shaft rotational speed sensor 28 for detecting a rotational speed NM of the main shaft 4c of the automatic transmission 4 is connected to the FI/AT•ECU 12. The FI/AT•ECU 12 uses the engine rotational speed NE and the main shaft rotational speed NM as input and output rotational speeds of the torque converter 4a to calculate an input-output rotational speed ratio ETR of the torque converter 4a (ETR=NM/NE).

The output shaft 3a of the engine 3 is connected to left and right front wheels W1, W2 which serve as main drive wheels, via the automatic transmission 4, a front differential 5, and left and right front drive shafts 6, 6. Further, the output shaft 3a is connected to left and right rear wheels W3, W4 which serve as auxiliary drive wheels, via the automatic transmission 4, the front differential 5, a transfer 7a, a propeller shaft 7b, a rear differential 8, and left and right rear drive shafts 9, 9.

The rear differential 8 includes left and right electromagnetic clutches 10, 10. Each electromagnetic clutch 10 is used for connecting and disconnecting the propeller shaft 7b to and from one of the rear drive shafts 9 corresponding to the propeller shaft 7b. When the electromagnetic clutches 10, 10 disconnect the propeller shaft 7b from the rear drive shafts 9, all the torque from the engine 3 is transmitted to the front wheels W1, W2, whereby the vehicle is set to a front wheel drive mode. On the other hand, when the electromagnetic clutches 10, 10 connect the propeller shaft 7b to the rear drive shafts 9, 9, the torque of the engine 3 is also transmitted to the rear wheels W3, W4, whereby the vehicle is set to a four wheel drive mode. Further, the electromagnetic clutches 10, 10 are configured such that the engagement force of each of them is continuously changed in response to a drive signal from a 2–4 WD•ECU 11, whereby torques transmitted to the left and right rear wheels W3, W4 are controlled independently of each other.

The rear differential 8 is provided with an oil temperature sensor 24 which senses a temperature (oil temperature) TOIL of lubricating oil lubricating the electromagnetic clutches 10, 10, and delivers a signal indicative of the sensed oil temperature TOIL to the 2–4 WD•ECU 11, referred to hereinbelow.

Further, wheel speed sensors 25 are arranged for the front and rear wheels W1 to W4. The four wheel speed sensors 25 detect wheel speeds VW1 to VW4 of the wheels W1 to W4, respectively, and deliver signals indicative of the detected wheel speeds VW1 to VW4 to an ABS•ECU 13. The ABS•ECU 13 is formed by a microcomputer, similarly to the FI/AT•ECU 12 described above, and carries out anti-lock control of the front and rear wheels W1 to W4. It should be note that a wheel speed detection system is constituted by the wheel speed sensors 25, the ABS•ECU 13, and other signal transmission passages including a harness having a coupler through which the signals indicative of the detected wheel speeds VW1 to VW4 are supplied to the 2–4 WD•ECU 11.

Further, a dash board, not shown, has a lock switch 26 arranged therein. The lock switch 26 is formed by a momentary switch and operated for execution of lock-mode control in which the rear differential 8 is locked. So long as the switch 26 is being depressed by the user, it delivers a lock switch signal indicative of the depressed state thereof to the 2–4 WD•ECU 11.

The 2–4 WD•ECU 11 forms a main or essential part of the apparatus 1 for determining a failure of the wheel speed sensors 25, according to the invention, and is implemented or formed by a microcomputer, similarly to the FI/AT•ECU 12 and the ABS•ECU 13. The 2–4 WD•ECU 11 receives signals indicative of sensor output values from the above sensors 20 to 25 and signals indicative of results of operations using the sensed parameter values, through serial communications. The 2–4 WD•ECU 11 carries out various arithmetic and logical operations based on these signals and the above lock switch signal, by executing control programs read from the ROM, using values of flags and computational values, referred to hereinafter, stored in the RAM. Particularly, the 2–4 WD•ECU 11 changes the engagement forces of the electromagnetic clutches 10, 10 according to the wheel speeds VW1 to VW4 which are sensed by the wheel speed sensors 25 and supplied to the 2–4 WD•ECU 11 via the ABS•ECU 13, whereby the 2–4 WD•ECU 11 controls torques transmitted to the rear wheels W3, W4. The 2–4 WD•ECU 11 also carries out a failure determination process, referred to hereinbelow, for determining a failure of the wheel speed sensors 25.

Figure 2:
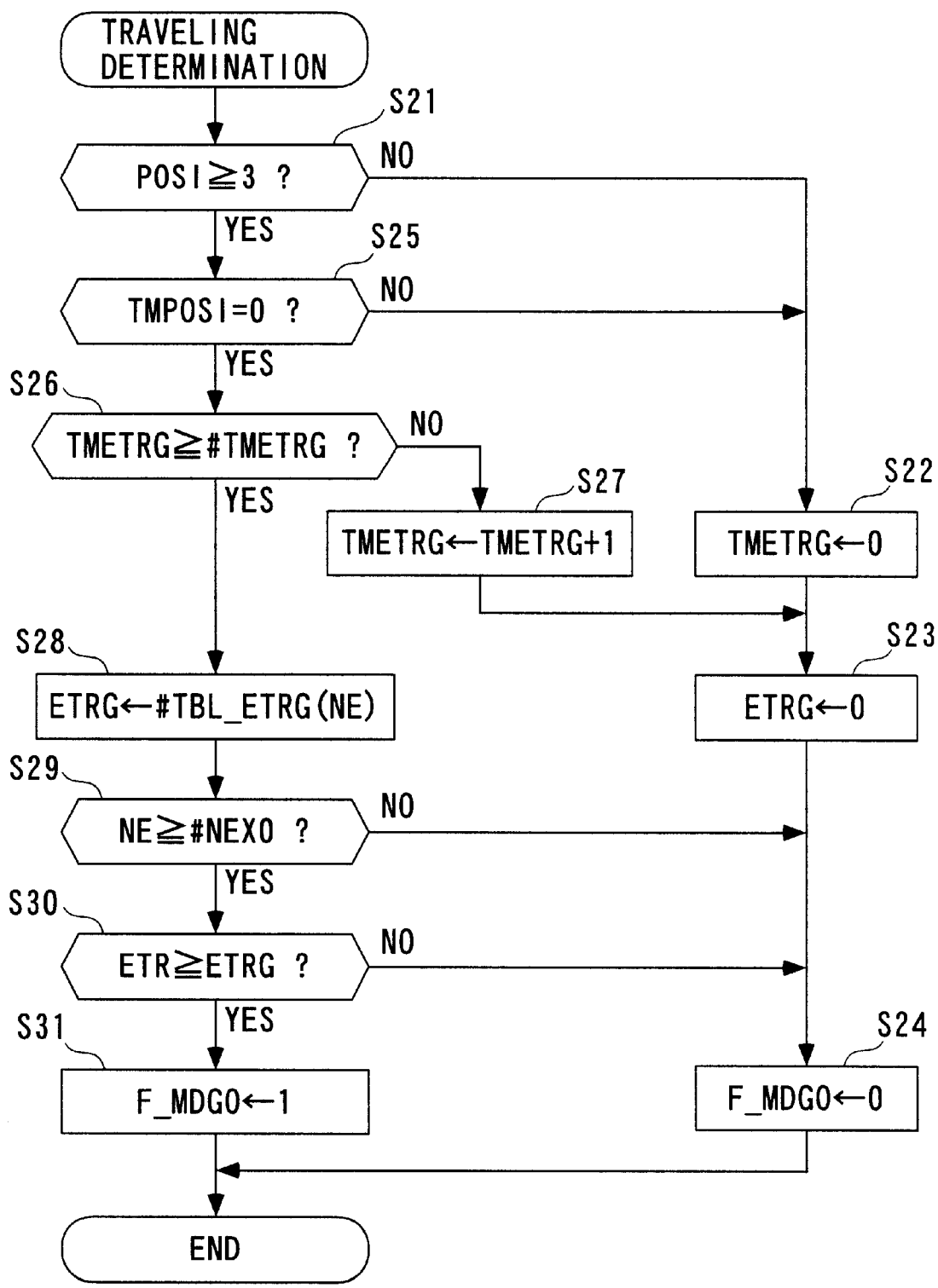
FIG. 2 is a flowchart showing a control program for carrying out a traveling determination process for determining whether or not the vehicle is traveling.
Figure 4:
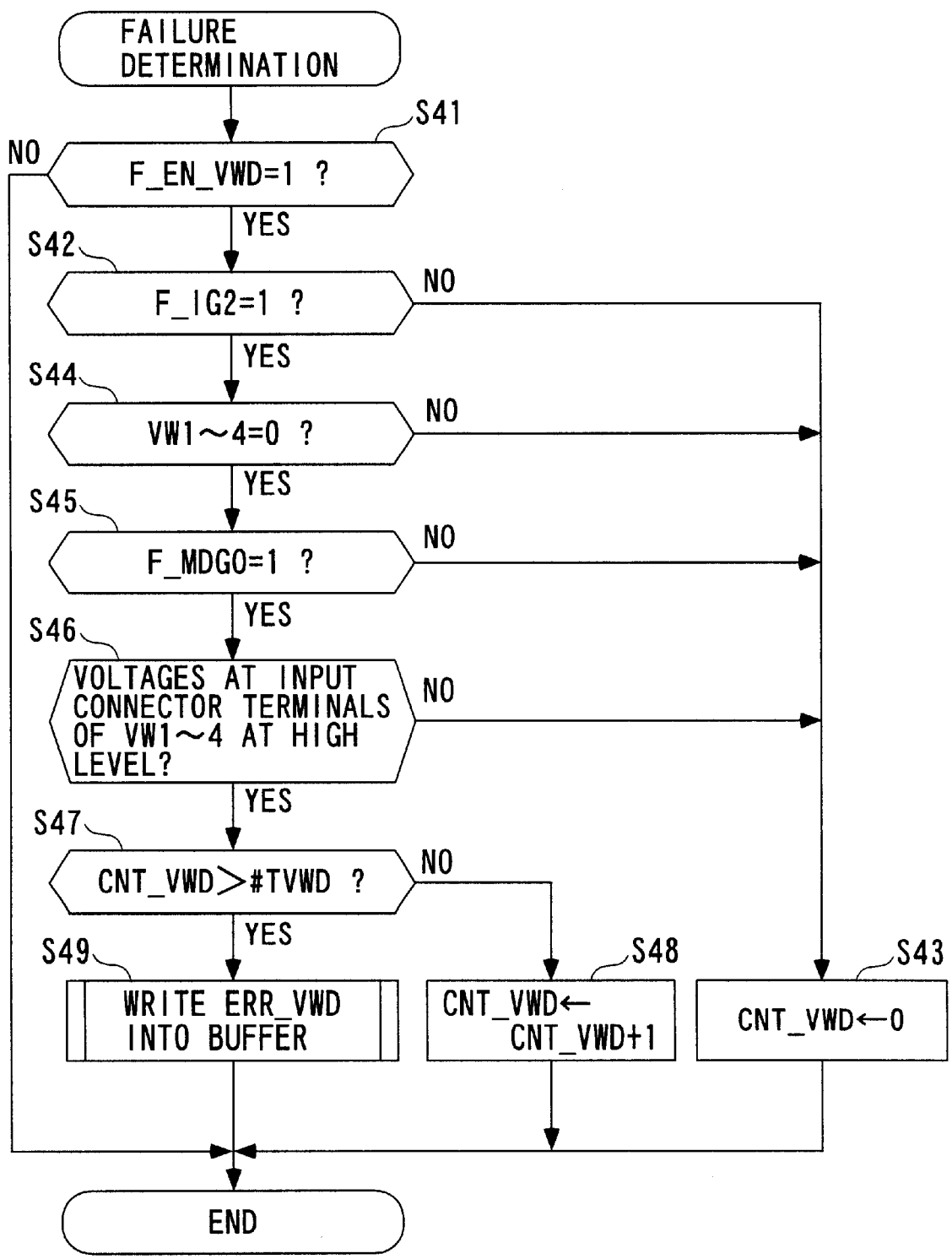
FIG. 4 is a flowchart showing a control program for carrying out a failure determination process for carrying out failure determination on the wheel speed sensor based on results of the FIG. 2 traveling determination.

FIGS. 2 and 4 are flowcharts showing control programs for carrying out the failure determination process. FIG. 2 shows a routine for executing a traveling determination process for determining whether or not the vehicle 2 is actually traveling. FIG. 4 shows a routine for carrying out the failure determination process, which is executed depending on results of the FIG. 2 traveling determination. The control programs are carried out at predetermined time intervals. It should be noted that in the following description, a mark # is added to each of heads of fixed values that are stored beforehand in the ROM as data items and table values, so as to show the fixed values in a state distinguishable from other variables that are stored in the RAM and updated.

In the FIG. 2 traveling determination process, first, it is determined at a step S21 whether or not the value of the shift position POSI sensed by the shift position sensor 21 is equal to or larger than a value "3". If the answer to the question of the step S21 is negative (No), i.e. if POSI≦2 holds (the shift position is any of "R", "N", "P" and "NO" positions), which means that the automatic transmission 4 is not in a traveling range, it is judged that conditions are not satisfied for execution of the traveling determination to determine whether or not the vehicle 2 is actually traveling. Then, at steps S22 and S23, a value of a traveling determination wait timer TMETRG, referred to hereinafter, and a threshold ETRG of the input-output rotational speed ratio ETR of the torque converter 4a are reset to "0", respectively, and a traveling determination flag F_MDGO is set to "0" at a step S24, followed by terminating the program.

If the answer to the question of the step S21 is affirmative (Yes), i.e. if the shift position is any of "1" to "D5", which means that the automatic transmission 4 is in the traveling range, it is determined at a step S25 whether or not the count of a NO position detection timer TMPOSI is equal to "0". The NO position detection timer TMPOSI is used for measuring or determining whether or not a predetermined time period has elapsed after the shift position sensor 21 ceased to indicate the "NO" position. If the answer to the question of the step S25 is negative (No), i.e. if the predetermined time period has not yet elapsed after the shift position sensor 21 ceased to indicate the "NO" position, it is judged that the shift position is not finally determined, and the above steps S22 to S24 are carried out, followed by terminating the program.

If the answer to the question of the step S25 is affirmative (Yes), i.e. if TMPOSI=0 holds, it is determined at a step S26 whether or not the value of the traveling determination wait timer TMETRG, which was reset to "0" at the above step S22, is equal to or larger than a predetermined value #TMETRG (corresponding to 3 seconds). If the answer to the question of the step S26 is negative (No), after the traveling determination wait timer TMETRG is incremented by "1" at a step S27, the above steps S23, S24 are carried out, followed by terminating the program.

Figure 3:
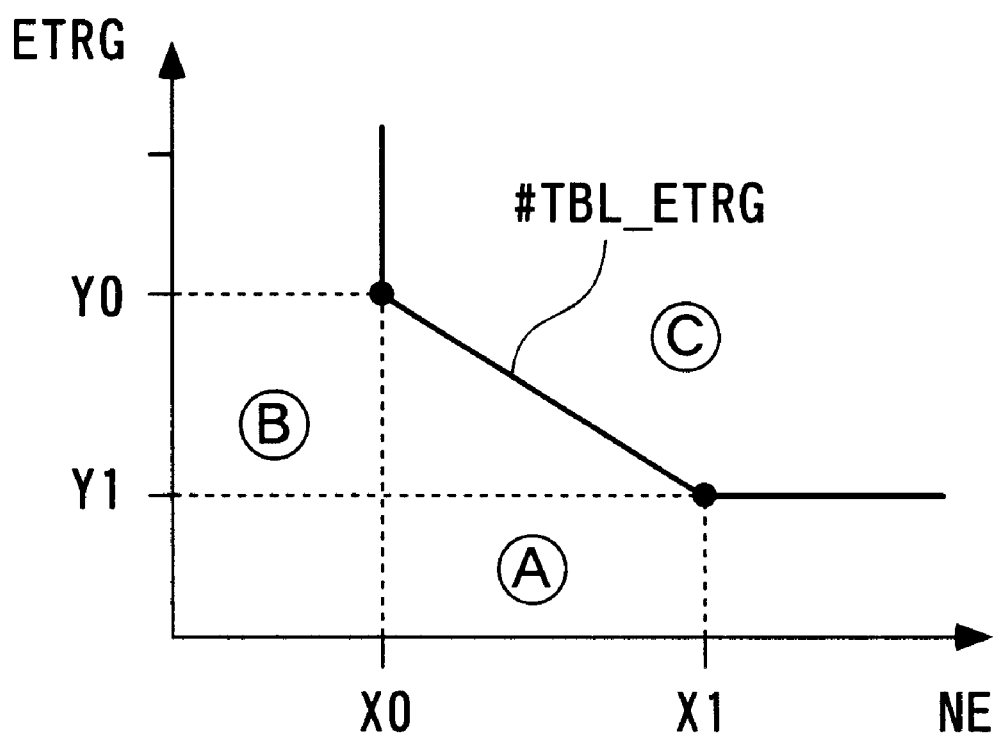
FIG. 3 is a diagram showing an example of a table which is employed for setting a threshold of an input-output rotational speed ratio of a torque converter.

If the answer to the question of the step S26 is affirmative (Yes), i.e. if TMETRG≧#TMETRG holds, which means that a predetermined time period corresponding to the predetermined value #TMETRG has elapsed after the automatic transmission 4 entered the traveling range from a neutral state, a table value #TBL__ETRG is retrieved from a table shown in FIG. 3 by way of example, according to the engine rotational speed NE and set to the threshold ETRG of the input-output rotational speed ratio ETR of the torque converter 4a, at a step S28.

The above threshold ETRG is used for determining whether or not the vehicle 2 is actually traveling. In the FIG. 3 table, the table value #TBL__ETRG is set to a predetermined value Y0 (#TBL__ETRGY0; e.g. 100%) for a lower limit value X0 (NEX0; e.g. 1000 rpm) of the engine rotational speed NE. This is because when the automatic transmission 4 is in the traveling range, which means that the vehicle 2 is traveling, the engine rotational speed NE assumes a value equal to or larger than a lower limit value so as to prevent an engine stall, and accordingly, the input-output rotational speed ratio ETR of the torque converter 4a, that is, a ratio of the rotational speed of an output shaft of the torque converter 4a, rigidly connected to the front wheels W1, W2, and the rotational speed of an input shaft of the torque converter 4a, i.e. the engine rotational speed, also assumes a value equal to or larger than a predetermined value. The lower limit value X0 (#NEX0) of the engine rotational speed NE and the predetermined value Y0 (#TBL__ETRGY0) corresponding to the lower limit value X0 indicated in the table correspond to the lower limit value of the engine rotational speed NE, and the predetermined value of the input-output rotational speed ratio ETR, mentioned above, respectively. Actually, the former are set to respective safer values, that is, slightly larger values than the latter.

Further, if an accelerator pedal is depressed to increase the engine rotational speed NE, in a state where the vehicle 2 is stopped with the brake pedal stepped on, the input-output rotational speed ratio ETR of the torque converter 4a is accordingly reduced but the output shaft thereof continues to be rotated with an increase in its rotational speed dependent the increases in the engine rotational speed NE. When the engine rotational speed NE reaches a certain upper limit value, the rotational speed of the output shaft becomes equal to "0", that is, engine stall occurs. An upper limit value X1 (#NEX1; e.g. 2500 rpm) of the engine rotational speed NE in the table corresponds to the above-mentioned upper limit value, and a predetermined value Y1 (#TBL__ETRGY1) corresponding to the upper limit value X1 (#NEX1) is set to a value (e.g. 30%) safer i.e. larger than "0". Further, the table value #TBL__ETRG is set such that it is linearly reduced as the engine rotational speed NE increases from the lower limit value #NEX0 to the upper limit value #NEX1.

It is clearly understood from the above settings that, a region C in the table in which the input-output rotational speed ratio ETR is equal to or larger than a line indicative of the table value #TBL__ETRG represents a region of NE-ETR in which it is absolutely impossible for the engine rotational speed NE and the input-output rotational speed ratio ETR to actually assume any corresponding pair of values within the region, when the output shaft of the torque converter 4a is necessarily rotated, and at the same time the vehicle 2 is standing, in other words, a region where the vehicle 2 is necessarily traveling. Further, a region A in the table where the input-output rotational speed ratio ETR is smaller than the line indicative of the table value #TBL__ETRG represents a region where the vehicle 2 cannot be necessarily determined to be traveling, and a region where it is certain that the vehicle 2 is standing, whereas a region B in the table where the engine rotational speed NE is smaller than the lower limit value #NEX0 represents a region in which the traveling determination cannot be carried out from the engine rotational speed NE.

After looking up the table thus configured, it is determined at a step S29 immediately after the step S28, whether or not the engine rotational speed NE is equal to or larger than the lower limit value #NEX0. If the answer to the question of the step S29 is negative (No), i.e. if NE<NEX0 holds, it is judged that the engine rotational speed NE is in the region B in the FIG. 3 table, and without executing traveling determination, the above step S24 is carried out for setting the traveling determination flag F__MDGO to "0", followed by terminating the program.

If the answer to the question of the step S29 is affirmative (Yes), i.e. if NE≧NEX0 holds, it is determined at a step S30 whether or not a value of the input-output rotational speed ratio ETR by actual calculation is equal to or larger than the threshold ETRG set at the step S28. If the answer to the question of the step S30 is negative (No), i.e. if ETR<ETRG holds, it is determined that the input-output rotational speed ratio ETR is in the region A in the FIG. 3 table in which the vehicle 2 cannot be necessarily determined to be traveling, and the above step S24 is carried out to set the traveling determination flag F__MDGO to "0", followed by terminating the program.

On the other hand, If the answer to the question of the step S30 is affirmative (Yes), i.e. if ETR≧ETRG holds, it is judged that the input-output rotational speed ratio ETR is in the region C in the FIG. 3 table in which the vehicle 2 is necessarily traveling, and the traveling determination flag F__MDG0 is set to "1" at a step S31, followed by terminating the program.

As described hereinabove, according to the traveling determination process shown in FIG. 2, it is possible to find the state of the vehicle 2 being necessarily traveling, based on only the engine rotational speed NE and the input-output rotational speed ratio ETR of the torque converter 4a, supplied as information from a drive side of the engine 3, thereby suitably carrying out traveling determination of the vehicle 2.

Next, the failure determination process executed depending on results of the FIG. 2 traveling determination will be described with reference to FIG. 4. This failure determination process especially determines whether or not a state in which the wheel speeds VW1 to VW4 output from the ABS•ECU 13 are all equal to the same value "0" is caused by actual stoppage of the vehicle 2, or by a state in which all the wheel speed signals indicative of the wheel speeds VW1 to VW4 are prevented from being delivered to the 2–4 WD•ECU 11 by disconnection of the coupler of the harness, breaking of a wire, or a failure of the ABS•ECU 13 itself.

In the failure determination process, first, it is determined at a step S41 whether or not an execution enable flag F__EN__VWD assumes "1". This execution enable flag F__EN__VWD is set to "1" by executing a control program, not shown, when conditions for executing the present program are satisfied. Therefore, if the answer to the question of the step S41 is negative (No), the program is immediately terminated.

If the answer to the question of the step S41 is affirmative (Yes), it is determined at a step S42 whether or not a power supply flag F__IG2 indicative of a state of supply of power to the ABS•ECU 13 assumes "1". If the answer to the question of the step S42 is negative (No), it is judged that the power of the ABS•ECU 13 is turned off, which means that the conditions for executing determination of failure due to disconnection of the coupler of the harness or the like are not satisfied, and a wheel speed error counter CNT_VWD, referred to hereinafter, is reset to "0"at a step S43, followed by terminating the program.

If the answer to the question of the step S42 is affirmative (Yes), it is determined at a step S44 whether or not the four wheel speeds VW1 to VW4 are all equal to the value "0". If the answer to the question of the step S44 is negative (No), i.e. if at least one of the wheel speeds VW1 to VW4 is not equal to the value "0", it is judged that the conditions for executing the aforementioned failure determination intended by the present process are not satisfied, and the above step S43 is carried out without executing the failure determination, followed by terminating the program.

If the answer to the question of the step S44 is affirmative (Yes), i.e. if the wheel speeds VW1 to VW4 all assume the value "0", it is determined at a step S45 whether or not the traveling determination flag F_MDG0 set at the FIG. 2 traveling determination process assumes "1". If the answer to the question of the step S45 is negative (No), i.e. if the vehicle 2 cannot be necessarily determined to be traveling, the above step S43 is carried out without executing the failure determination, followed by terminating the program.

If the answer to the question of the step S45 is affirmative (Yes), i.e. if the traveling determination flag F_MDG0=1 holds, which means that the vehicle 2 is necessarily traveling, it is determined at a step S46 whether or not the voltages at respective input connector terminals of VW1 to VW4 in the 2–4 WD•ECU 11 are all at "High" level. This determination is performed because the input connector terminals of VW1 to VW4 are designed such that the voltages thereat become "High" when the 2–4 WD•ECU 11 is disconnected from the ABS•ECU 13 due to detachment of the harness or the like. It should be noted, however, that the above state of all these voltages become "High" can occur even when the wheel speed detection system is normal, which prevents a final determination that there has occurred detachment of the harness or the like from being made based on the determination at the step S46 alone. If the answer to the question of the step S46 is negative (No), i.e. if at least one of the voltages of the input connector terminals of VW1 to VW4 is at "Low" level, it is judged that the conditions for executing the failure determination by the present process are not satisfied, and the above step S43 is carried out instead of executing the failure determination, followed by terminating the program.

On the other hand, if the answer to the question of the step S46 is affirmative (Yes), i.e. if in spite of the traveling determination flag F_MDG0=1, which means that the vehicle 2 is necessarily traveling, the wheel speeds VW1 to VW4 all assume the value "0", and at the same time the voltages at the input connector terminals thereof are all at "High" level, it is determined that there has occurred a failure due to disconnection of the coupler of the harness, breaking of a wire, or a failure of the ABS•ECU 13 itself. Then, it is determined at a step S47 whether or not the count of the wheel speed error counter CNT_VWD reset at the step S43 has exceeded a predetermined value #TVWD (e.g. 3 seconds) thereof. If the answer to the question of the step S47 is negative (No), i.e. if CNT_VWD ≦#TVWD holds, the wheel speed error counter CNT_VWD is incremented by "1" at a step S48, followed by terminating the program. On the other hand, If the answer to the question of the step S47 is affirmative (Yes), i.e. if CNT_VWD>#TVWD holds, it is judged that a state in which the above failure is determined to have occurred has continued for a time period corresponding to the predetermined value #TVWD.

Therefore, the determination of the occurrence of the failure is finalized, so that an error code ERR_VWD for indicating the final determination of the occurrence of the failure is written in a corresponding buffer at a step S49, followed by terminating the program.

As described hereinabove, according to the present embodiment, whether the vehicle 2 is traveling or not is determined based on the engine rotational speed NE and the input-output rotational speed ratio ETR of the torque converter 4a when the automatic transmission 4 is in the traveling range. Therefore, the traveling determination can be carried out properly or accurately. Further, when it is determined that the vehicle 2 is traveling, if all the four wheel speeds VW1 to VW4 assume the value "0", it is possible to determine that there has occurred a failure due to disconnection of the coupler of the harness, breaking a wire, or a failure of the ABS_ECU 13 itself. Further, when the vehicle 2 is actually standing, this state of the vehicle 2 is appropriately determined by the FIG. 2 traveling determination process, whereby it is possible to reliably avoid erroneous failure determination of the wheel speed sensors when they are normal.

Further, the engine rotational speed NE and the input-output rotational speed ratio ETR of the torque converter 4a, as parameters for the traveling determination, are input as information from the drive side of the engine 3 not via the ABS•ECU 13, and only the wheel speed signals indicative of the wheel speeds VW1 to VW4 are input from the ABS•ECU 13. Accordingly, even if the ABS•ECU 13 has failed, determination of traveling of the vehicle 2 can be suitably carried out without being adversely affected by this failure, and it is possible to carry out the failure determination on the wheel speed sensors independently by using only the 2–4 WD•ECU 11.

Still further, traveling determination and failure determination are inhibited by the traveling determination wait timer TMETRG for a predetermined time period after the automatic transmission 4 has entered the traveling range from its neutral state, so that even if the input-output rotational speed ratio ETR of the torque converter 4a becomes unstable immediately after the automatic transmission 4 has entered the traveling range, it is possible to eliminate adverse influence of the unstable input-output rotational speed ratio ETR on traveling determination and failure determination, thereby properly carrying out the determinations.

The present invention is not necessarily limited to the above embodiment, but it can be put into practice in various forms. For instance, although in the above embodiment, particularly to determine a failure due to disconnection of the coupler of the harness for connection between the ABS•ECU 13 and the 2–4 WD•ECU 11, or the like, failure determination is carried out on condition that all the four wheel speeds VW1 to VW4 assume the value "0", this is not limitative, but when it is determined that the vehicle 2 is traveling, if at least one of the wheel speeds VW1 to VW4 assumes the value "0", it may be judged that a wheel speed sensor 25 indicating the wheel speed "0" has failed, whereby a failure of each wheel speed sensor 25 per se can be determined individually.

Further, although in the present embodiment, the invention is applied to a torque control system for a part-time four-wheel-drive vehicle with a front-wheel drive mode as its main drive mode, by way of example, this is not limitative, but the invention can be widely applied to various uses, including torque control systems for a part-time fourwheel-drive vehicle with a rear-wheel drive mode as its main drive mode and a full-time four-wheel-drive vehicle, an ABS control system for controlling torques transmitted to wheels according to results of wheel speed detection by wheel speed sensors, a traction control system, a brake control system, and the like.

It is further understood by those skilled in the art that the foregoing is a preferred embodiment of the invention, and that various changes and modifications may be made without departing from the spirit and scope thereof.

What is claimed is:

1. An apparatus for determining a failure of a wheel speed detection system of an automotive vehicle including an internal combustion engine, an automatic transmission having a torque converter, and a plurality of wheels, said wheel speed detection system including a plurality of wheel speed sensors for detecting respective wheel speeds of said plurality of wheels, for control of torques transmitted to at least two of said plurality of wheels via said automatic transmission, the apparatus comprising:

engine rotational speed detection means for detecting a rotational speed of said engine;

input-output rotational speed ratio calculation means for calculating an input-output rotational speed ratio of said torque converter based on an input rotational speed and an output rotational speed of said torque converter;

shift range detection means for detecting a shift range of said automatic transmission;

traveling state determination means for determining whether or not said vehicle is traveling, based on said detected engine rotational speed and said calculated input-output rotational speed ratio when said shift range detected by said shift range detection means is a traveling range;

sensor failure determination means for determining that said wheel speed detection system has failed if it is determined by said traveling state determination means that said vehicle is traveling, and at the same time, at least one of said plurality of wheel speed sensors indicates a stopped state of a corresponding one of said wheels; and failure determination inhibition means for inhibiting failure determination by said sensor failure determination means for a predetermined time period after said shift range detection means detects that said shift range of said automatic transmission is switched to said traveling range from a neutral state of said automatic transmission.

2. An apparatus according to claim 1, wherein said traveling state determination means includes a table defining a region in which said vehicle is determined to be necessarily traveling, based on a relationship between said engine rotational speed and said input-output rotational speed ratio.

3. An apparatus according to claim 1, wherein when any of said plurality of wheel speed sensors indicates a stopped state of a corresponding one of said plurality of wheels, said sensor failure determination means determines that said any of said plurality of wheel speed sensors has failed.

4. An apparatus for determining a failure of a wheel speed detection system of an automotive vehicle including an internal combustion engine, an automatic transmission having a torque converter, and a plurality of wheels, said wheel speed detection system including a plurality of wheel speed sensors for detecting respective wheel speeds of said plurality of wheels, for control of torques transmitted to at least two of said plurality of wheels via said automatic transmission, the apparatus comprising:

engine rotational speed detection means for detecting a rotational speed of said engine;

input-output rotational speed ratio calculation means for calculating an input-output rotational speed ratio of said torque converter based on an input rotational speed and an output rotational speed of said torque converter;

shift range detection means for detecting a shift range of said automatic transmission;

traveling state determination means for determining whether or not said vehicle is traveling, based on said detected engine rotional speed and said calculated input-output rotational speed ratio when said shift range detected by said shift range detection means is a traveling range; and sensor failure determination means for determining that said wheel speed detection system has failed if it is determined by said traveling state determination means that said vehicle is traveling, and at the same time, at least one of said plurality of wheel speed sensors indicates a stopped state of a corresponding one of said wheels, wherein when all of said plurality of wheel speed sensors indicate respective stopped states of said plurality of wheels associated therewith, said sensor failure determination means determines that said wheel speed detection system has failed.

5. An apparatus according to claim 4, wherein said travelling state determination means includes a table defining a region in which said vehicle is determined to be necessarily traveling, based on a relationship between said engine rotational speed and said input-output rotational speed ratio.

6. An apparatus according to claim 4, wherein when any of said plurality of wheel speed sensors indicates a stopped state of a corresponding one of said plurality of wheels, said sensor failure determination means determines that said any of said plurality of wheel speed sensors has failed.

* * * * *